United States Patent Office 3,553,664
Patented Jan. 5, 1971

3,553,664
MONITORING APPARATUS
Huel C. Tucker, Texas City, Tex., assignor to Monsanto Company, St. Louis, Mo., a corporation of Delaware
Filed July 15, 1968, Ser. No. 744,897
Int. Cl. G08b 29/00
U.S. Cl. 340—227
10 Claims

ABSTRACT OF THE DISCLOSURE

An apparatus for monitoring the duration of pulses of variable voltage derived from a system used for the detection and suppression of explosions in closed vessels comprising a source of energy and a detector responsive thereto, a means for activating said source of energy and generating a reference pulse, a voltage discriminator for detecting the level of voltage derived from said detector and for generating a signal pulse, logic circuitry for comparing the duration of said reference pulse with said signal pulse and a utilization means responsive to the output from said logic circuitry.

BACKGROUND OF THE INVENTION

This invention relates to an apparatus for monitoring the duration of pulses of variable voltage. More particularly, the present invention relates to an apparatus for monitoring the output of a photoelectric detector. The apparatus finds special application in conjunction with a system which is used for detecting and suppressing explosions in closed vessels wherein chemical reactions are being carried out.

In many chemical reactions and other processes, there exists the possibility of explosion. It is expedient in these cases that there be means for suppressing any incipient explosion before it reaches catastrophic proportions. It is well known that an explosion involving a gaseous mixture is not an instantaneous event but rather one which requires some measurably finite time from the moment of ignition to the development of maximum pressure. It is also well known that an explosion involving a gaseous mixture commences as a tiny sphere of flame, the sphere expanding at the pressure develops to a maximum. The suppression of explosions involves detection of ignition and a means for introduction of a suppressant to arrest the growth of pressure before it reaches dangerous levels. Since explosions of gaseous materials involve flame fronts with attendant emission of light, the detection of ignition can be accomplished by using a photoelectric detector sensitive to the light emitted. In most cases, the photoelectric detectors employed in sensing the ignition of an explosion, are mounted on sight glasses built into the walls of the containing vessel.

With lapse of time and depending on the components present in the vessel, a coating oftentimes develops on the surface of the sight glasses reducing the transmission of any light to the photoelectric detectors. As this coating increases in thickness, the level of light seen by the photoelectric detector from any explosion ignition source in the vessel may be reduced to the point where detection occurs too late to suppress the explosion. In most vessels employed in gaseous chemical reactions, access to the interior of the vessel to clean the sight glasses is very difficult and involves great expense. It is extremely desirable, therefore, to have an apparatus and method for determining if the photoelectric detectors are responding to a "safe level" of light, i.e., to see if the sight glasses are coated to such an extent that an incipient explosion would not be detected until a dangerous point had been reached. At the same time, it is desirable to ascertain whether the photoelectric detectors themselves are in proper working order.

SUMMARY

It is, therefore, an object of the present invention to provide an apparatus for monitoring the output of a photoelectric detector used as part of a system for the detection and suppression of explosions. It is also an object of the present invention to provide an appaartus for monitoring the duration of pulses of varying voltage. Additional objects will become apparent from the drawings, the description of the invention given herein, and the appended claims.

In accordance with the present invention, there is provided a monitoring apparatus comprising in combination: means for generating an electrical impulse; a source of energy connected to said means for generating an electrical impulse and responsive to said electrical impulse; means for generating a gating pulse of predetermined duration connected to said means for generating an electrical impulse and responsive to said electrical impulse; detecting means responsive to and disposed to receive energy from said source of energy; means for discriminating the voltage level of a pulse of variable voltage derived from said detecting means such that when said voltage level exceeds a preset level, a pulse of variable duration, said pulse of variable duration having duration equal to the length of time said voltage level exceeds said preset level, is generated; gating circuit for receiving and comparing the duration of said pulse of variable duration with the duration of said gating pulse; and, utilization means connected to the output of said gating circuit, said utilization means being activated whenever the duration of said gating pulse exceeds the duration of said pulse of variable duration.

The use of the apparatus of the invention to monitor the output of a photoelectric detector, used as part of a system for the detection and suppression of explosions in closed vessel, provides a rapid, reliable, and inexpensive method for ascertaining the condition of the photoelectric detection system and extent of any coating which may have accumulated on the sight glasses.

DESCRIPTION OF THE PREFERRED EMBODIMENTS

Figure 1:
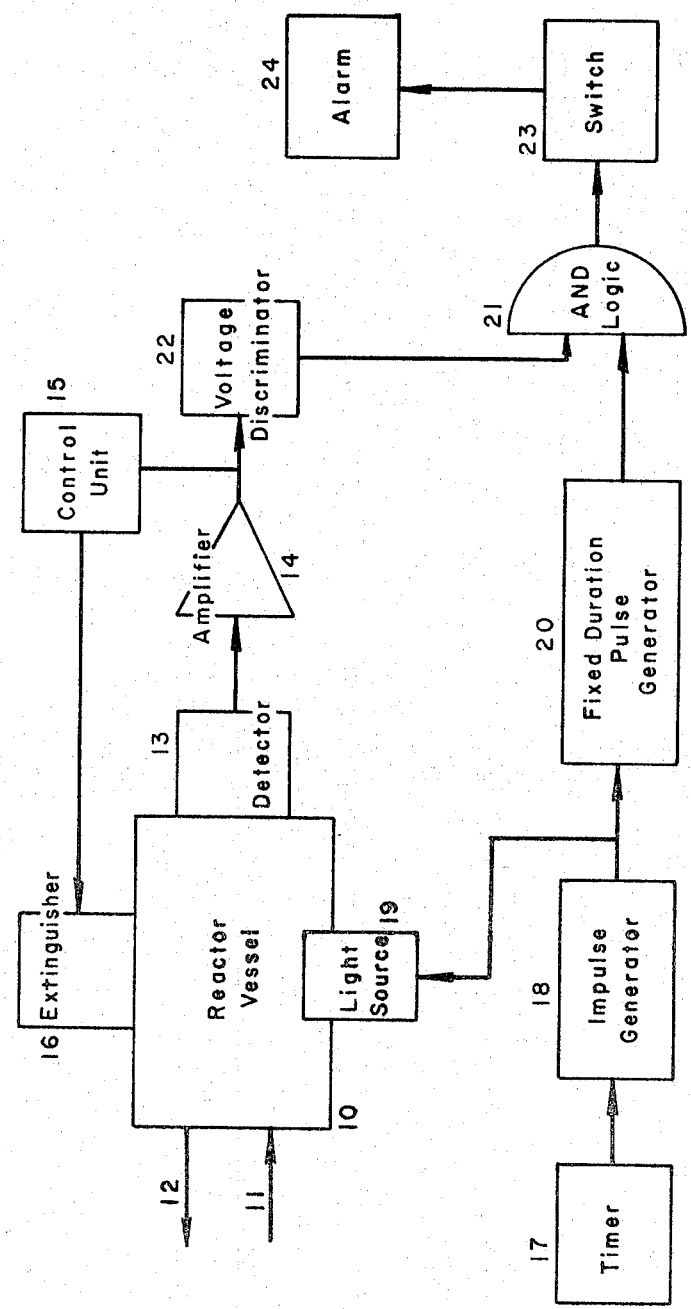
FIG. 1 is a schematic diagram of the present invention used as a monitor for an explosion suppression system in a chemical reaction vessel.

Reference is now made to FIG. 1 for an understanding of the use of a preferred embodiment of the present invention as a monitor for an explosion suppression system in closed vessels. Vessel 10 having inlet 11 and outlet 12 for the introduction and removal of chemical reactants and products, respectively, is equipped with photoelectric detector 13 mounted on a sight glass (not shown) located in the side of vessel 10. Only one photoelectric detector is shown in the schematic for purposes of simplicity; however, in practice a plurality of photoelectric detectors is employed, the plurality forming a common output. When a plurality of detectors is used, they are disposed such that the entire inside of vessel 10 may be observed to insure against any explosion remaining undetected. In the event of an incipient explosion within vessel 10, the light emitted therefrom is detected by detector 13, the signal amplified by amplifier 14 and transmitted to electrical control unit 15. Control unit 15 in turn activates an extinguisher means 16 causing a chemical suppressant to be dispersed throughout vessel 10 extinguishing the flame front of the explosion. Amplifier 14, control unit 15 and extinguisher means 16 are parts of commercially available explosion suppression systems and do not form part of the invention claimed herein.

Figure 2:
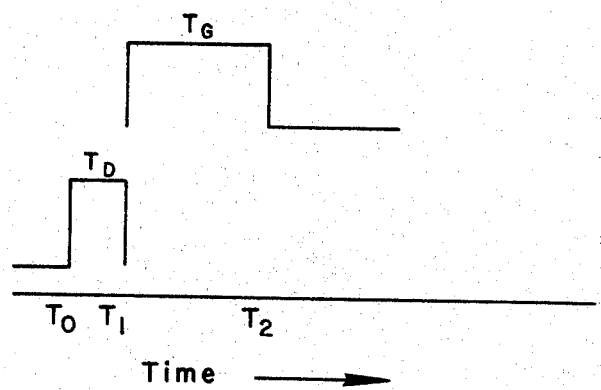
FIG. 2 is a graphical representation of the duration of the pulses generated by pulse generator 19 in FIG. 1.

The preferred monitor system works in the following way. Automatic timer 17 which is basically an astable or free-running multivibrator emits a pulse having relatively short duration, preferably less than 0.1 millisecond and whose frequency is determined by the RC time constant and voltage supplies of the circuit. The pulse from timer 17 acts to drive high-energy impulse generator 18 where a relatively high-energy electrical impulse of extremely short duration is generated. This high-energy electrical impulse produced at generator 18 is transmitted to high-intensity flash tube 19 mounted in vessel 10 where it results in a high-intensity flash of light of very short duration and whose intensity decays exponentially with time. The high-energy electrical impulse is simultaneously transmitted to pulse generator 20 where a rectangular gating pulse of predetermined duration is generated. In the preferred embodiment described herein, pulse generator 20 is of the delayed pulse type. This may be accomplished by two-series coupled monostable multivibrators. In this case, the start of the pulse coming from the second multivibrator, i.e., the rectangular gating pulse, is triggered by the end of the pulse coming from the first multivibrator, i.e., the delay pulse. The duration of the delay pulse from the first multivibrator is the delay time and is determined by the RC time constant of the circuit. In the preferred embodiment, the circuit components are chosen such that the delay time is around 150 microseconds. This delay time is necessary to take into account the inherent lag time in response present in the detection system. The wave forms shown in FIG. 2 graphically demonstrate the delayed pulse mechanism. The pulse from the first multivibrator, $T_D$, i.e., the delay pulse is seen to have a duration of $T_1-T_0$. The pulse from the second multivibrator, $T_G$, i.e., the rectangular gating pulse has duration of $T_2-T_1$. It is thus seen that the start of the rectangular gating pulse is delayed by a period of time equal to the difference of $T_1-T_0$. Preferably, the second multivibrator in pulse generator 20 contains a variable resistor means whereby the timer $T_2-T_1$ can be adjusted over a range from about 0.2 to about 1 millisecond.

The rectangular gating pulse thus developed in generator 20 is transmitted to one input of gating circuit 21. The light flash emitted from flash tube 19 is detected by photoelectric detector 13 which in turn generates a voltage proportional to the intensity of the light seen. The voltage generated by photoelectric detector 13 is amplified by amplifier 14 and transmitted to voltage discriminator 22. In the preferred embodiment, discriminator 22 is a regenerative bistable circuit, such as a Schmitt trigger, whose state depends upon the amplitude of the input voltage such that when the voltage generated by photoelectric detector 13 exceeds a preset level, discriminator 22 emits a rectangular pulse having a duration equal to the length of time the voltage level of the voltage generated by the detector 13 exceeds the preset level. Thus, the pulse coming from the discriminator 22 will have a duration varying directly as the voltage level of the voltage generated by photoelectric detector 13 which in turn is directly proportional to the decaying flash of light from flash tube 19. This pulse of varying duration is transmitted to a second input of gating circuit 21 to be compared with the gating pulse from pulse generator 20.

Gating circuit 21 in the preferred embodiment is a two-transistor coincidence circuit commonly referred to in logic terminology as an AND gate. In such a circuit, an output is obtained only when both transistors are in the so-called "ON" or conducting state. In the quiescent state, the transistor to which the pulse from discriminator 22 is fed, hereinafter called a signal transistor, is maintained in the conducting state while the transistor to which the gating pulse is fed, hereafter called the reference transistor is maintained in the non-conducting state. The pulse of varying duration from discriminator 22 acts to turn the signal transistor "OFF," i.e., to a non-conducting state whereas the gating pulse acts to turn the refernce transistor "ON." If the pulse of varying duration from discriminator 22 holds the signal transistor "OFF" for a period longer than the period in which the reference transistor is held "ON" by the gating pulse, no output from gating circuit 21 occurs. If, however, the duration of the pulse of varying duration at the signal transistor is shorter than the duration of the gating pulse at the reference transistor, the signal transistor turns "ON" while the reference transistor is "ON" thereby resulting in an output from gating circuit 21. Any output from gating circuit 21 can be transmitted to a utilization means which can be a warning system or an emergency action initiator such as a means for shutting down reactor vessel 10. In the preferred embodiment of FIG. 1, the utilization means comprises electronic switch 23 which can be a monostable multivibrator, used to trigger alarm means 24 which can be a bell, buzzer or any other suitable alarm. The activation of alarm means 24 indicates a "safe" level of light is not being detected by detector 13, meaning that the sight glass or glasses through which the light is passing is coated or at least partially coated or that the detector or amplifier are functioning improperly.

In order to ascertain what is a safe level of light, the monitor system is calibrated when the sight glass or glasses are free from any coating. To do this, a variable resistor in pulse generator 20 is adjusted such that the duration $(T_2-T_1)$ of the gating pulse is just slightly shorter than the duration of the pulse of varying duration derived from discriminator 22. Under these conditions, alarm means 24 will not be activated. If, however, for any reason the duration of the pulse of varying duration derived from discriminator 22 becomes shorter than the gating pulse, alarm 24 is activated as described above. It is thus seen that the monitor system of the present invention provides an efficeient and accurate means for determining when the sight glasses in the reactor are coated or when detector 13 is not properly operating. It should be noted that during the test period when flash tube 19 emits a light flash, control unit 15 does not activate extinguisher 16 for the reason that control unit 15 contains a delay which normally has a delay time in the order of several milliseconds and the duration of the light flash is set to be less than the delay time.

While in the above preferred embodiment automatic timer 17 is used to periodically activate high-energy impulse generator 18, it is to be understood that activation could be carried out manually rather than automatically. It is preferred, however, to use automatic timing. As said above, the frequency of the pulse from timer 17 is dependent upon the RC time constant of the circuit. In a preferred embodiment the components which determine the RC time constant are chosen such that the frequency is one pulse per 2.5 minutes. By using a variable resistor means in timer 17, the frequency can be continuously varied from one per 10 seconds to two per hour. As will also be readily recognized by those skilled in the art, numerous variations in circuitry components and designs can be used without departing from the scope of the present invention.

The monitor system of the present invention finds particular application in reactor systems wherein oxidative chlorination reactions are being carried out and in which the gaseous reaction mixture comprises oxygen, hydrogen chloride, ethylene and a light hydrocarbon diluent.

What is claimed is:
1. A monitoring apparatus comprising in combination:
    means for generating an electrical impulse,
    a source of energy connected to said means for generating an electrical impulse and responsive to said electrical impulse,
    means for generating a gating pulse of predetermined duration connected to said means for generating an electrical impulse and responsive to said electrical impulse, detecting means responsive to and disposed to receive energy from said source of energy, means for discriminating the voltage level of a pulse of variable voltage derived from said detecting means such that when said voltage level exceeds a preset level, a pulse of variable duration having duration equal to the length of time said voltage level exceeds said preset level, is generated, a gating circuit for receiving and comparing the duration of said pulse of variable duration with the duration of said gating pulse, and a utilization means connected to the output of said gating circuit, said utilization means being activated whenever the duration of said gating pulse exceeds the duration of said pulse of variable duration.

2. The apparatus of claim 1 wherein an automatic timer is used to activate said means for generating an electrical impulse.

3. The apparatus of claim 2 wherein said means for discriminating said voltage level comprises a Schmitt trigger.

4. The apparatus of claim 3 wherein said means for generating said gating pulse contains a means for delaying the start of said gating pulse.

5. The apparatus of claim 4 wherein said means for generating said gating pulse contains a variable resistance element for adjusting the duration of said gating pulse.

6. The apparatus of claim 5 wherein said gating circuit is an AND circuit.

7. The apparatus of claim 6 wherein said source of energy is a high-intensity flash tube.

8. The apparatus of claim 7 wherein said detecting means is a photoelectric detector.

9. The apparatus of claim 8 wherein said utilization means comprises an electronic switch connected to an alarm system or the like, said switch closing whenever the duration of said gating pulse exceeds the duration of said pulse of variable duration whereby said alarm system is actuated.

10. The apparatus of claim 9 wherein said high-intensity flash tube and said photoelectric detector are mounted in a closed vessel used for chemical reactions whereby the light emitted from said flash tube may be detected by said photoelectric detector.

References Cited
UNITED STATES PATENTS

| | | | |
|---|---|---|---|
| 3,161,863 | 12/1964 | Deziel | 340—410 |
| 3,435,239 | 3/1969 | Stalberg | 250—218 |

ROBERT L. RICHARDSON, Primary Examiner

U.S. Cl. X.R.

23—266; 250—218; 340—410; 431—24